United States Patent [19]

Fukatsu

[11] Patent Number: 5,181,128
[45] Date of Patent: Jan. 19, 1993

[54] METHOD AND APPARATUS FOR READING IMAGE USING A LINE IMAGE SENSOR

[75] Inventor: Yasushi Fukatsu, Yokohama, Japan

[73] Assignee: Kabushiki Kaisha Toshiba, Kawasaki, Japan

[21] Appl. No.: 760,362

[22] Filed: Sep. 16, 1991

[30] Foreign Application Priority Data

Sep. 17, 1990 [JP] Japan ................... 2-246443

[51] Int. Cl.[5] .............................. H04N 1/40
[52] U.S. Cl. ..................... 358/486; 358/487
[58] Field of Search ............... 358/486–487, 358/457, 466

[56] References Cited

U.S. PATENT DOCUMENTS 4,656,525 4/1987 Norris ................... 358/487
5,072,303 12/1991 Silverberg ............ 358/486

*Primary Examiner*—Stephen Brinich
*Attorney, Agent, or Firm*—Foley & Lardner

[57] ABSTRACT

A method for reading optical image information using a line image sensor is disclosed which comprises the steps of reading in the optical image information at a spatial frequency in the reading in the sub-scanning direction adapted to be higher than the spatial frequency in the reading in the main scanning direction and converting the read optical image information into an electric signal and outputting the electric signal to the outside. Also disclosed is an apparatus for reading optical image information according to the above method, and which comprises feed means for feeding a medium with the optical image information represented thereon in the sub-scanning direction so that the line image sensor may read the optical image information in the sub-scanning direction, control means for controlling the feed means so that the spatial frequency in the reading in the sub-scanning direction may become higher than the spatial frequency in the reading in the main scanning direction, and line density conversion means for converting an electric signal output from the line image sensor upon its reading the optical image information so that the line density in the sub-scanning direction and the line density in the main scanning direction may concur.

8 Claims, 4 Drawing Sheets

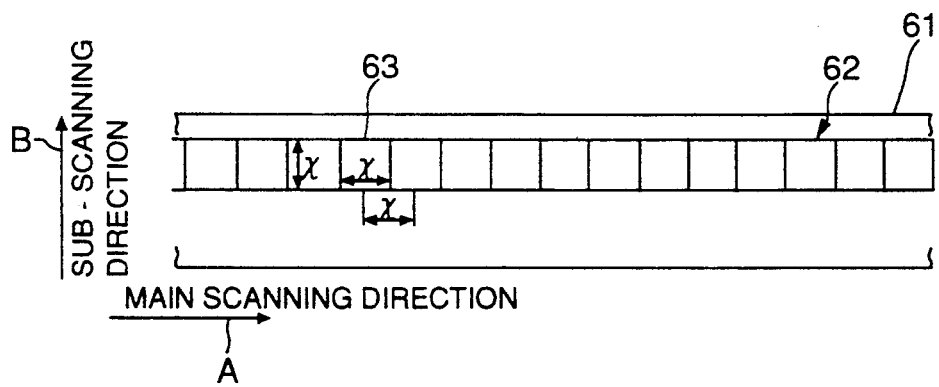
FIG. 1 PRIOR ART
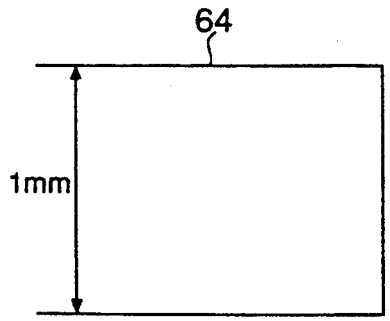
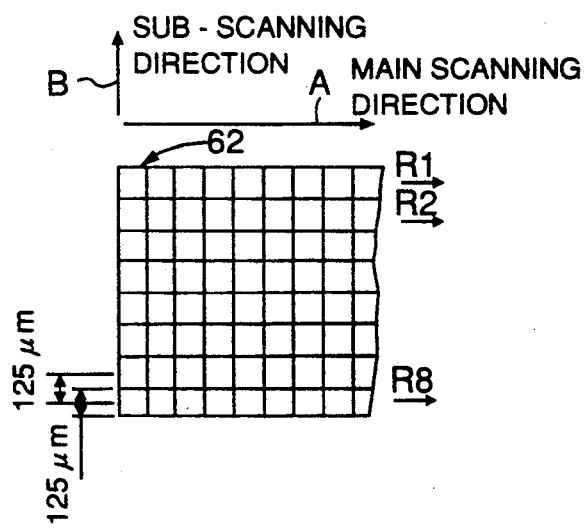
FIG. 2A PRIOR ART
FIG. 2B PRIOR ART

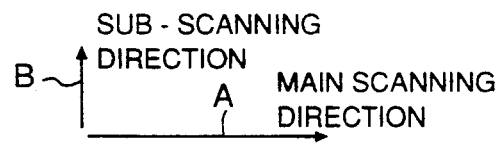
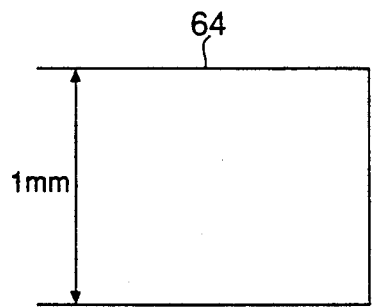
FIG. 3A  FIG. 3B
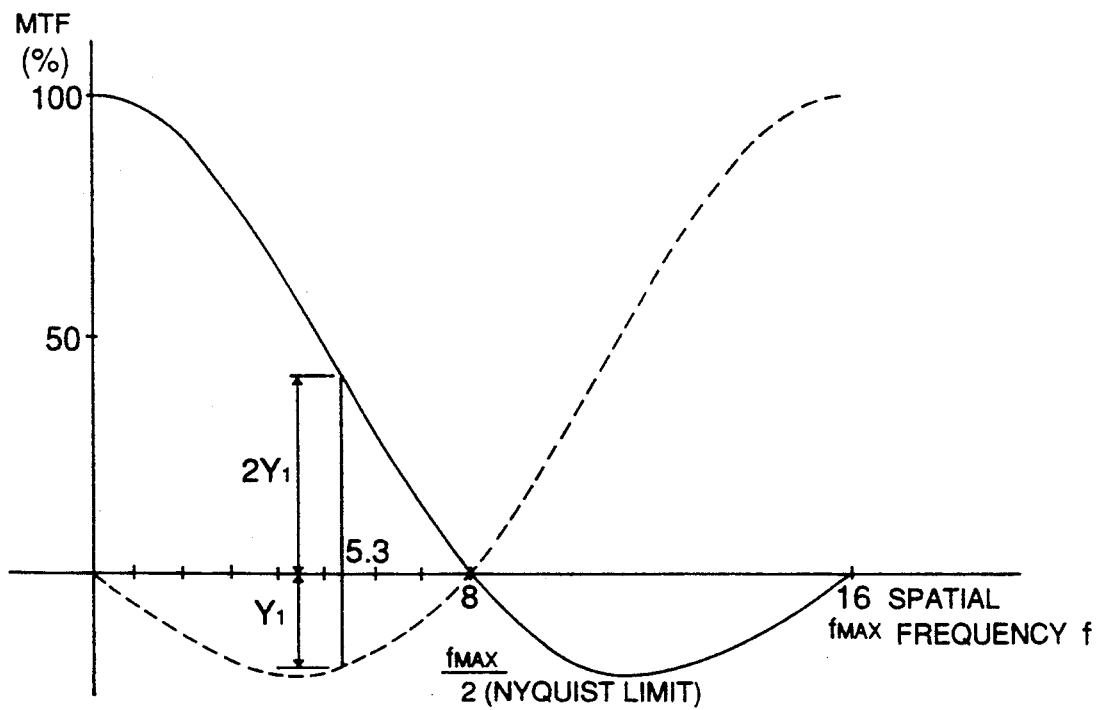
FIG. 4

METHOD AND APPARATUS FOR READING IMAGE USING A LINE IMAGE SENSOR

BACKGROUND OF THE INVENTION

The present invention relates to a method for reading an image using a line image sensor, and an apparatus for reading an image a, such as a scanner or a facsimile device.

In reading an image using a line image sensor, reading has conventionally been carried out at the same space frequency in both the main scanning direction and the sub-scanning direction. FIG. 1 shows a row of pixels 63 of a line image sensor 62 within a CCD chip 61. There are pixels 63 with a vertical dimension and horizontal dimension that are both X, arranged the pixel pitch X. By causing the line image sensor 62 to scan in the main scanning direction (indicated by the arrow A) parallel to the lengthwise direction of the line image sensor 62 and, in addition, feeding a sheet of paper with an image drawn thereon in the sub-scanning direction (indicated by the arrow B) perpendicular to the main scanning direction, two-dimensional optical image information is read and converted into electric signals.

Supposing now that the dimension X of the pixels 63 is 125 $\mu$m, for example, the reading in the main scanning direction is performed with the distance 1 mm divided for 8 pixels. Thus, inevitably, the reading accuracy in the main scanning direction is limited by the pixel pitch X.

Since the reading in the sub-scanning direction is carried out at the same spatial frequency as that at which the reading in the main scanning direction is carried out, this reading is also carried out with 1 mm in the vertical direction being divided for 8 pixels. In FIG. 2A, there is shown an image 64 with the height 1 mm to be read. In reading this image 64, it is necessary to move the line image sensor 62 in the sub-scanning direction, as shown in FIG. 2B. Actually, sub-scanning is performed by feeding a sheet of paper with the image 64 drawn thereon in the direction B, relative to the line image sensor 62 fixed in place. Thereby, the image 64 with the height 1 mm is read by the line image sensor 62 with the height 125 $\mu$m, through 8 scannings from the first reading (R1) to the eighth reading (R8), having the image 64 of the height 1 mm divided by eight Thus, the reading accuracy in the sub-scanning direction has also been affected by the pixel pitch X, so that it has been impossible to improve reading accuracy. Accuracy may be improved, however, if the pixel pitch X is made smaller, but this is restricted by the complexity of the fabrication process and increased cost.

SUMMARY OF THE INVENTION

Accordingly, an object of the present invention is to provide a method for reading an image, in which the reading accuracy in the sub-scanning direction is improved and not restricted by the pixel pitch, while using the same line image sensor as that used conventionally, and to provide an apparatus for reading an image using such a method.

According to the present invention, there is provided a method for reading optical image information using a line image sensor, and which comprises the steps of reading the optical image information at a spatial frequency in the reading in the sub-scanning direction perpendicular to the lengthwise direction of the row of pixels adapted to be higher than the spatial frequency in the reading in the main scanning direction parallel to the lengthwise direction, and converting the read optical image information into an electric signal and outputting the electric signal to the outside.

When the reading in the sub-scanning direction is carried out at the same spatial frequency as that in the reading in the main scanning direction, the reading accuracy in the sub-scanning direction is restricted by the pixel pitch of the line image sensor as with that in the main scanning direction, but by reading with the spatial frequency in the reading in the sub-scanning direction adapted to be higher than that in the main scanning direction, a higher reading accuracy can be attained.

According to the present invention, there is provided an image reading apparatus which comprises feed means for feeding a medium with the optical image information represented thereon in the sub-scanning direction perpendicular to the lengthwise direction of the row of pixels so that the line image sensor may read the optical image information in the sub-scanning direction, control means for controlling the feed means so that the spatial frequency in the reading in the sub-scanning direction may become higher than the spatial frequency in the reading in the main scanning direction parallel to the lengthwise direction, and a line density conversion means for converting an electric signal output from the line image sensor upon its reading the optical image information, so that the line density in the sub-scanning direction and the line density in the main scanning direction may concur. By the use of such an image reading apparatus, the image reading method according to the present invention can be executed.

The image reading apparatus, in order to be applied to a facsimile device, further comprises a coding processor means, accepting the electric signal converted by the line density conversion means so that the line density in the sub-scanning direction and the line density in the main scanning direction may concur, for applying coding processing to the electric signal so that the same can be transmitted, and outputting the coded electric signal to a data bus, a decoding processor means that accepts the electric signal transmitted from the data bus and applies decoding processing to the same and outputting the same, and an image processor means that accepts the decoded electric signal, for applying image processing to the electric signal so that the same can be printed out and outputting the same.

Furthermore, the feed means may include a motor for feeding a medium with the optical image information represented thereon and motor driving means for controlling the rotating speed of the motor. The control means may issue an instruction signal to the motor driving means to control the rotating speed of the motor, so that the spatial frequency in the reading in the sub-scanning direction may become higher than the spatial frequency in the reading in the main scanning direction parallel to the lengthwise direction.

Furthermore, the control means may be such that controls the feed means so that the spatial frequency in the reading in the sub-scanning direction can be changed at will within the range of the same being higher than the spatial frequency in the reading in the main scanning direction parallel to the lengthwise direction. In such case, the reading accuracy in the sub-scanning direction can be freely changed as needed.

BRIEF DESCRIPTION OF THE DRAWINGS

In the accompanying drawings,

FIG. 1 is an explanatory diagram showing a structure of a line image sensor for use in the method for reading an image, and the apparatus using the method of the present invention;

FIG. 2A and FIG. 2B are explanatory diagrams showing a conventional method for reading an image;

FIG. 3A and FIG. 3B are explanatory diagrams showing a method for reading an image according to an embodiment of the present invention;

FIG. 4 is an explanatory diagram showing the relationship between the spatial frequency and MTF in the above image reading method;

DESCRIPTION OF THE PREFERRED EMBODIMENT

Figure 5:
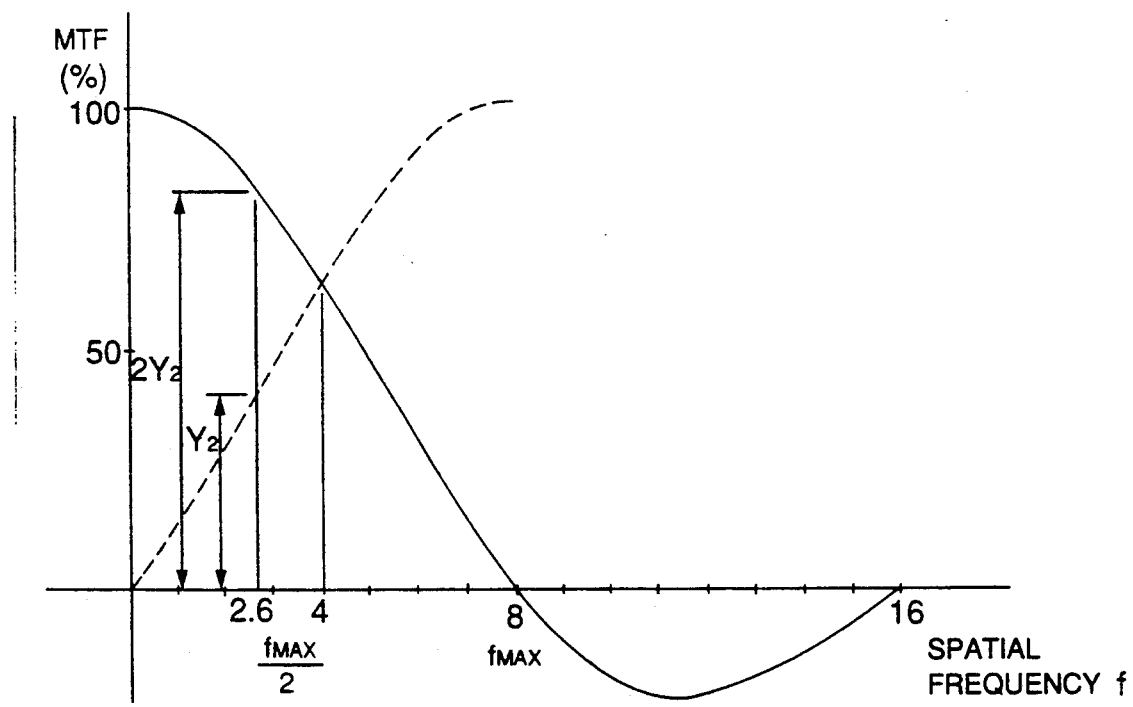
FIG. 5 is an explanatory diagram showing the relationship between the spatial frequency and MTF in the conventional image reading method.

An embodiment of the present invention will be described below with reference to the accompanying drawings. First, the image reading method according to the present embodiment will be described. The line image sensor used in this method is the same as the conventional one shown in FIG. 1. The point in which the present image reading method differs from the conventional method is that the spatial frequency in reading in the sub-scanning direction is higher than the spatial frequency in the reading in the main scanning direction.

An image 64 with the height 1 mm shown in FIG. 3A is progressively read with a line image sensor 62 shown in FIG. 3B in both the main scanning direction (direction A) and the sub-scanning direction (direction B).

The reading accuracy in the main scanning direction is determined by the pixel pitch X of the line image sensor 62 as heretofore, i.e., the distance 1 mm is divided for 8 pixels to be read. In the sub-scanning direction, the reading is carried out at twice as high a density as that in the main scanning direction, i.e., 1 mm is divided for 16 pixels to be read. In concrete terms, the paper is fed in the direction B in increments of 62.5 $\mu$m with respect to the line image sensor 62 with the height 125 $\mu$m and, thereby, 16 times of scanning are performed from the first reading (R1) to the 16th reading (R16). That is, the same position in the image 64 is read twice, in a duplicated manner.

Now, the following is an investigation into how much the image reading method of the present embodiment can improve reading accuracy over that of the conventional case. In general, the resolution of an image sensor is evaluated by MTF (modulation transfer function) with respect to the spatial frequency of the optical image obtained by focusing. The MTF is a transmission function expressed by the ratio of the output to the input, which, when reading is performed using a line image sensor whose pixel pitch is p and side is $\Delta x$ long, is expressed as $$\text{MTF} = \sin[(f/f_{MAX})\cdot(\pi\cdot\Delta x/p)]/[(f/f_{MAX})\cdot(\pi\cdot\Delta x/p)], \quad (1)$$

where $f_{MAX}$ represents the spatial frequency corresponding to the pixel pitch p.

We now assume that the vertical pixel dimension $\Delta x$ of the line image sensor is 125 $\mu$m, the pixel pitch p is 62.5 $\mu$m because an image of 1 mm is read through 16 times of scanning, and the spatial frequency $f_{MAX}$ is $1/p = 16$ lp/mm. The relationship between the spatial frequency $f_{MAX}$ and MTF at this time is given by the expression (1) as shown by the solid line in FIG. 4. The Nyquist limit $f_{MAX}/2$ indicating the readable limit based on Nyquist's theorem is given by $$f_{MAX} = 1/(2p) = 1/(2\times 62.5\ \mu m) = 8\ \text{lp/mm}.$$

This means that the image can be read to the degree of 8 lp/mm. The value of MTF at this time is 0%.

When discussing the resolution in actual image formation on a line image sensor, the effect of a spurious signal due to the harmonic component must be considered. The relationship between the spatial frequency $f_{MAX}$ with the spurious signal taken into consideration and MTF is shown by the dotted line. Here, it is assumed that the amplitude of the spurious signal is ½ or less of the right signal. Under such conditions, the spatial frequency f, at which the value of MTF for the right signal indicated by the solid line becomes $2Y_1$, double the value $Y_1$ of the MTF when the spurious signal is taken into consideration indicated by the broken line, is found to be 5.3 lp/mm. Therefore, according to the present embodiment, reading of the image pattern to the degree of 5.3 lp/mm, when the harmonic component is taken into consideration, becomes possible.

On the other hand, the resolution when the image is read in the conventional method becomes as described below. The same line image sensor as that shown in FIG. 1 is used in this case. Accordingly, the vertical dimension $\Delta x$ is 125 $\mu$m and the pixel pitch p is 125 $\mu$m becomes 1 mm is read through 8 times of scanning, and the spatial frequency $f_{MAX}$ becomes $1/p = 8$ lp/mm. The relationship between the spatial frequency f and MTF becomes as indicated by the solid line in FIG. 5. The Nyquist limit $f_{MAX}/2$ is found as $$f_{MAX} = 1/(2p) = 1/(2\times 125) = 4\ \text{lp/mm}.$$

The MTF value at this time is 64%.

When the spurious signal due to the harmonic component is also taken into consideration in this case, the relationship between the spatial frequency f and MTF is indicated by the dotted line in FIG. 5. The spatial frequency f, at which the value of MTF for the right signal indicated by the solid line becomes $2Y_2$, double the value $Y_2$ of the MTF with the spurious signal taken into consideration indicated by the dotted line, is found to be 2.6 lp/mm.

Thus, it is known that reading to the of 5.3 lp/mm is possible in the present embodiment as described above, while the image pattern can be read only to the degree of 2.6 lp/mm in the conventional method, and the reading accuracy is thereby improved. According to the present embodiment, as described in the foregoing, the reading accuracy in the sub-scanning direction can be improved while the same line image sensor as that used in the conventional method is used, and is not restricted by the magnitude of the pixel pitch.

Figure 6:
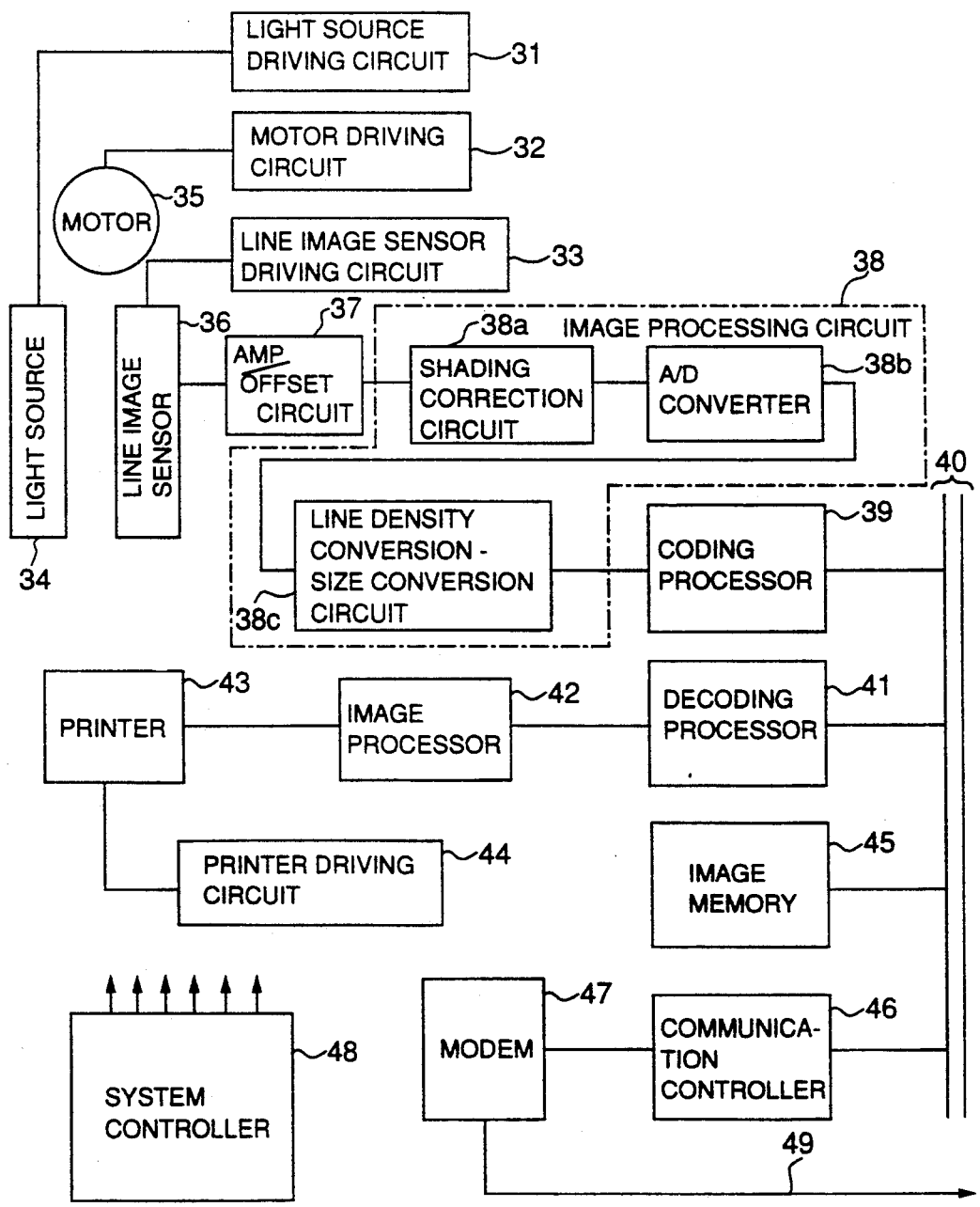
FIG. 6 is a block diagram showing a structure of a facsimile device as an embodiment of the apparatus for reading image according to the present invention.

Now, the image reading apparatus of the present embodiment which reads an image according to the above described method will be described. There are various devices such as a scanner in the image reading apparatus, a facsimile device is taken as an example here as its structure shown in FIG. 6.

There are provided a line image sensor 36 and a line image sensor driving circuit 33 for driving the line image sensor 36, as well as a light source 34 necessary for the line image, sensor 36 to read an image and a light source driving circuit 31. A motor 35 is provided for feeding the paper with an image drawn thereon. The starting, stopping, and feed speed of the motor is controlled by a motor driving circuit 32, under instructions from a system controller 48.

The line image sensor 36 reads optical image information and converts it into an electric image signal to be output therefrom. The output image signal is amplified and subjected to setting of the origin of the signal in an AMP/offset circuit 37, to be output therefrom as a signal related to the origin. The image signal output from the AMP/offset circuit 37 is input to the image processing circuit 38.

The image signal is first input to a shading correction circuit 38a. Since the reading of an image by the line image sensor 36 is performed through a lens, the circumferential portion of the screen has a lower illuminance than the central portion. The shading correction circuit 38a corrects the error in the contrast of the image on account any such difference in illuminance. The image signal corrected for contrast is input to an A/D converter 38b, to be converted from an analog signal to a digital signal. The thus converted image signal is input to a line density conversion-size conversion circuit 38c. The image signal is subjected to conversion of the line density in the image and conversion for the size of paper and, thereby, adapted to a format meeting the requirements for data communication when it is transmitted over a data bus 40. The thus converted image signal is input to a coding processor 39, wherein the signal is subjected to coding processing, and is then transmitted over the data bus 40. The transmitted image signal is supplied, after being once stored in an image memory 45 or directly, to a communication controller 46 for controlling the timing of communication, and then, to a modem 47 to be converted into an analog signal. Thereafter, it is transmitted over a telephone line 49. All the circuit operations are controlled by the system controller 48.

Data sent over a facsimile device on the other end through the telephone line 49 is converted into a digital form in the modem 47 and transmitted to the data bus 40 through the communication controller 46. The transmitted data is input, after being stored in the image memory 45 or directly, to a decoding processor 41 to be decoded to an image signal and output therefrom. The output image signal is input to an image processor 42 for conversion of the line density and conversion for paper size, and then, printed out by a printer 43 controlled by a printer driving circuit 44.

In the present apparatus, in order that the reading by the image reading method according to the present embodiment is performed, the system controller 48 and the line density conversion-size conversion circuit 38c are provided with different functions from those in conventional types. The system controller 48 issues instructions to the motor driving circuit 33 so that the motor 35 feeds the paper in a lower speed than in normal reading. An image is read by the line image sensor 36 and output therefrom as an image signal. The output image signal has a greater quantity of information in the sub-scanning direction than in the main scanning direction. In the image reading method of the above described embodiment, the quantity of information in the sub-scanning direction is twice as great as that in the main scanning direction. Accordingly, conversion of the line density is performed so that the line density in the sub-scanning direction may become twice as high as that in the main scanning direction. Thus, while using the same line image sensor 36 as that used in the conventional method, image reading in which an improved reading accuracy in the sub-scanning direction, which is not restricted by the pixel pitch, can be achieved.

The above described embodiments are each to be taken as an example of the same and the present invention is not limited to them. For example, the spatial frequency in the sub-scanning direction is not necessarily twice as high as that in the main scanning direction, but is only required to be relatively high. Although the facsimile device is mentioned as an example of the image reading apparatus, the invention is applicable to other devices such as a scanner. Accordingly, the function to send read image information over a telephone line is not always necessary.

What is claimed is:

1. A method for reading optical image information using a line image sensor, said image reading method comprising the steps of:

reading said optical image information at a spatial frequency in the reading in the sub-scanning direction perpendicular to the lengthwise direction of the row of pixels adapted to be higher than the spatial frequency in the reading in the main scanning direction parallel to said lengthwise direction; and converting said read optical image information into an electric signal and outputting the electric signal to the outside.

2. An apparatus for reading optical image information using a line image sensor, said image reading apparatus comprising:

feed means for feeding a medium with said optical image information represented thereon in the sub-scanning direction perpendicular to the lengthwise direction of the row of pixels, so that said line image sensor may read said optical image information in the sub-scanning direction;

control means for controlling said feed means so that the spatial frequency in the reading in the sub-scanning direction may become higher than the spatial frequency in the reading in the main scanning direction parallel to the lengthwise direction; and line density conversion means for converting an electric signal output from said line image sensor upon its reading said optical image information so that the line density in the sub-scanning direction and the line density in the main scanning direction may concur.

3. An image reading apparatus according to claim 2, further comprising:

coding processor means, accepting said electric signal converted by said line density conversion means so that the line density in the sub-scanning direction and the line density in the main scanning direction may concur, for applying coding processing to said electric signal so that the same can be transmitted and outputting said coded electric signal to a data bus;

decoding processor means, accepting said electric signal transmitted from said data bus, for applying decoding processing to the same and outputting the same; and image processor means, accepting said decoded electric signal, for applying image processing to said electric signal so that the same can be printed and outputting the same.

4. An image reading apparatus according to claim 2, wherein said feed means includes a motor for feeding a medium with said optical image information represented thereon and motor driving means for controlling the rotating speed of said motor; and said control means issues an instruction signal to said motor driving means to control the rotating speed of said motor so that the spatial frequency in the reading in the sub-scanning direction may become higher than the spatial frequency in the reading in the main scanning direction parallel to the lengthwise direction.

5. An image reading apparatus according to claim 2, wherein said control means controls said feed means so that the spatial frequency in the reading in the sub-scanning direction can be changed at will within the range of the same being higher than the spatial frequency in the reading in the main scanning direction parallel to the lengthwise direction.

6. An image reading apparatus according to claim 3, wherein said feed means includes a motor for feeding a medium with said optical image information represented thereon and motor driving means for controlling the rotating speed of said motor; and said control means issues instruction signal to said motor driving means to control the rotating speed of said motor so that the spatial frequency in the reading in the sub-scanning direction may become higher than the spatial frequency in the reading in the main scanning direction parallel to the lengthwise direction.

7. An image reading apparatus according to claim 3, wherein said control means controls said feed means so that the spatial frequency in the reading in the sub-scanning direction can be changed at will within the range of the same being higher than the spatial frequency in the reading in the main scanning direction parallel to the lengthwise direction.

8. An image reading apparatus according to claim 4, wherein said control means controls said feed means so that the spatial frequency in the reading in the sub-scanning direction can be changed at will within the range of the same being higher than the spatial frequency in the reading in the main scanning direction parallel to the lengthwise direction.

* * * * *